Sept. 11, 1962 E. F. GORMAN ETAL 3,053,967
GAS STREAM-SHIELDED ARC WORKING
Filed April 25, 1960 2 Sheets-Sheet 2
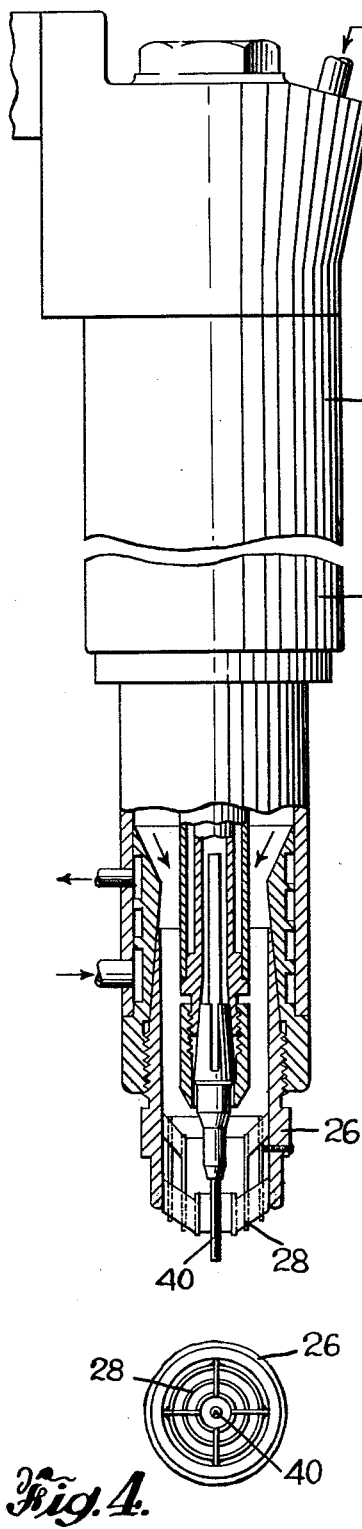
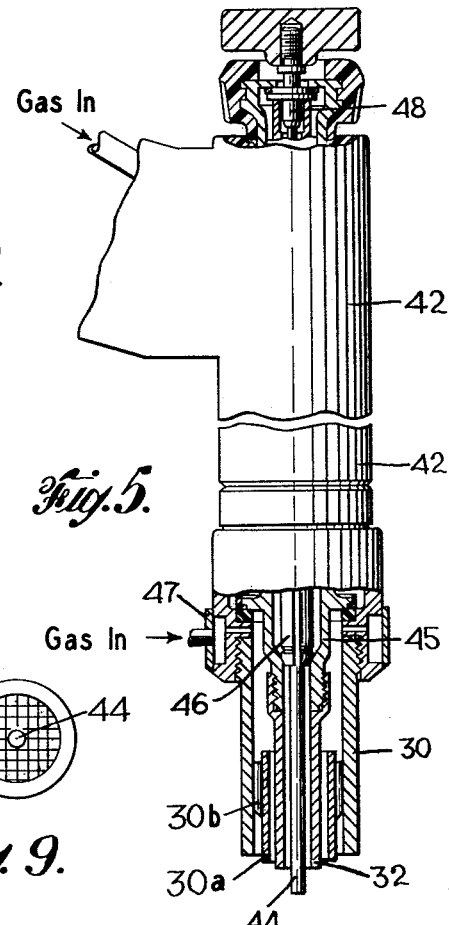
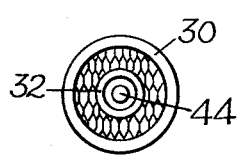
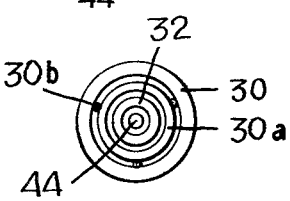
INVENTORS
EUGENE F. GORMAN
LOUIS M. MECKLER, III
ROBERT J. NELSON
ARTHUR J. NEWMAN
BY Barnwell R. King
ATTORNEY

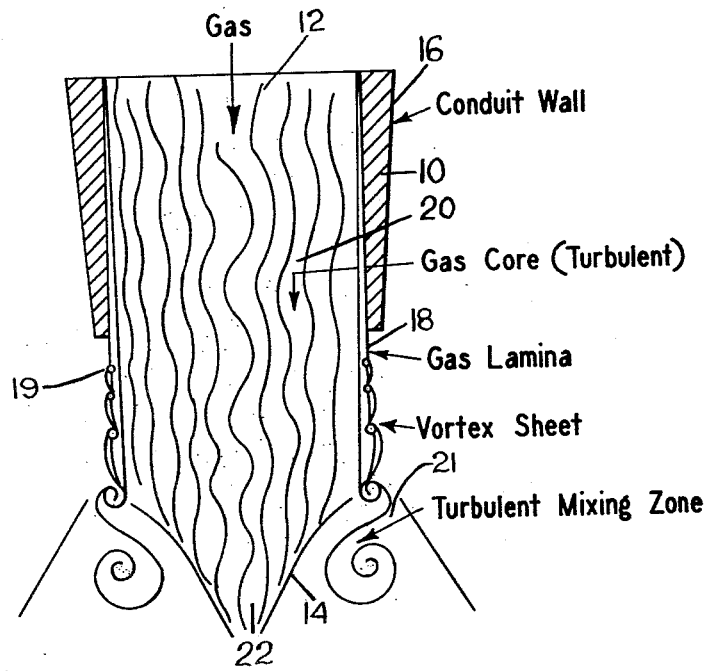
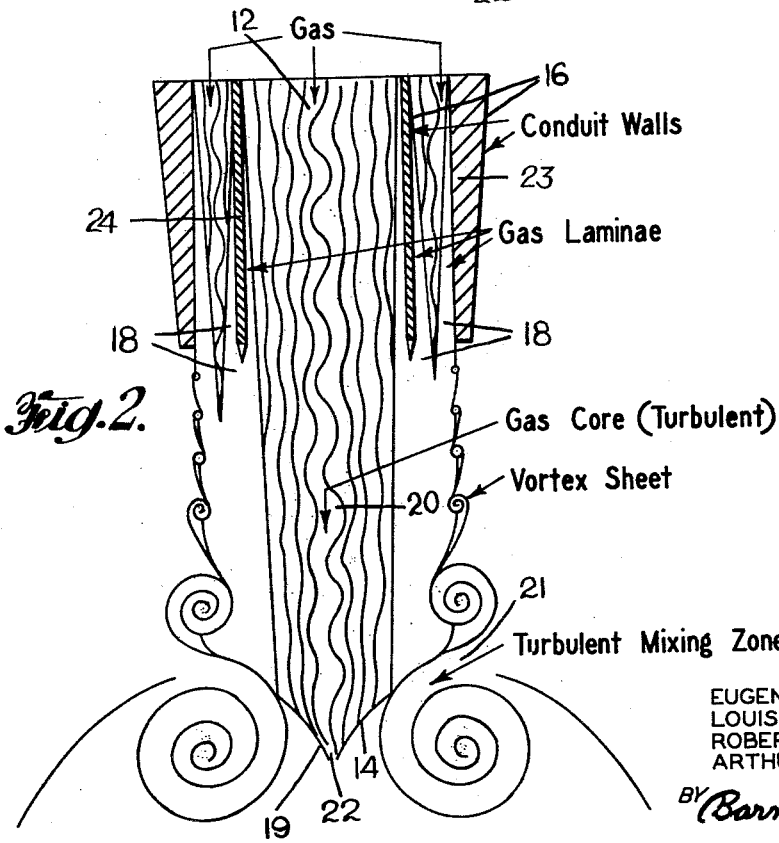

3,053,967
GAS STREAM-SHIELDED ARC WORKING
Eugene F. Gorman, Rutherford, Louis M. Meckler III, East Hanover, Robert J. Nelson, Elizabeth, and Arthur J. Newman, North Plainfield, N.J., assignors to Union Carbide Corporation, a corporation of New York
Filed Apr. 25, 1960, Ser. No. 24,325
9 Claims. (Cl. 219—74)

This invention relates to gas shielding, and more particularly to gas stream-shielded electric arc working with either a refractory, or a consumable electrode.

It has long been a problem to obtain maximum utilization of an arc shielding gas as it exits from a torch nozzle or gas cup conduit. For example, the technical literature describes welding torch designs intended to produce laminar or non-turbulent flow within the conduit. A series of internal conduit design parameters has been proposed by Mikhalapov Patent No. 2,544,711 and by Drake Patent No. 2,468,808. The configurations so derived, however, are seldom practical as they require excessive physical lengths of the conduit. The problem of obtaining good shielding is aggravated by a trend towards very small, light weight torches. In such modern torches such conduit design parameters cannot be employed with the result that adequate shielding is obtained only when the nozzle is held very close to the weldment, which in many cases is highly objectionable.

The main object of this invention is to provide optimum gas shielding with as short a conduit as possible.

According to the invention extended coherent streaming of shielding gas is accomplished by generating a multiplicity of separate gas-sheaths within the gas stream itself, which act to protect an inner arc-shielding core of such gas from the air even in case such core is turbulent.

More particularly according to the invention there is provided an insert for an arc torch provided with a nozzle surrounding an elongated electrode to provide a gas shielding discharge space, said insert consisting of a grid of partitions the major wall surfaces of which are parallel to the direction of flow of such gas, and means for securing said insert in such space, the effect of said insert being to allow the use of a relatively short (less than three inches) nozzle with optimum gas shielding of an arc energized at the end of such electrode, regardless of the degree of turbulence in the core of the gas stream discharged thereby.

The invention greatly facilitates operator control of the welding process, because short nozzle-to-work distances are no longer required. Thus, maximum visibility of the electrode, arc, and weld are possible and, at the same time, maximum accessibility to the weld joint is obtained.

With the invention maximum shielding is obtained with minimum gas consumpton; and it is unnecessary to obtain fully developed laminar flow. Hence, it is now possible to produce practical torches, nozzles and auxiliary shielding systems of relatively short lengths yet to obtain extended coherent streaming, since the presence of the multiple gas sheaths acts in a special way to stabilize the gas flow pattern and to prevent the infiltration of air despite the presence of some degree of turbulence in the gas stream.

For the first time, the invention makes possible torches, nozzles, and shielding systems producing extended coherent-streaming when the physical length of the gas conduit is of small dimension, even less than 1 inch, regardless of the cross-sectional area or velocity of the total gas stream.

In the drawings:

FIG. 1 is a fragmentary view in vertical cross-section of the outlet end portion of a nozzle with gas flowing therefrom;

FIG. 2 is a similar view of a nozzle containing an internal concentric nozzle;

FIG. 3 is a fragmentary view in side elevation, with parts broken away and shown in section, of a torch illustrating the invention;

FIG. 4 is a bottom plan view of the nozzle structure of such torch;

FIG. 5 is a fragmentary view in side elevation, with parts broken away and shown in section, of another torch illustrating the invention;

FIG. 6 is a bottom plan view of the nozzle structure of such torch;

FIG. 7 is a bottom plan view of a nozzle system with a grid comprised of a bundle of tubes;

FIG. 8 is a bottom plan view of a nozzle system with a honeycomb insert grid; and FIG. 9 is a bottom plan view of a nozzle with a grid having a rectangular lattice.

As a result of a fundamental investigation of the phenomenon which maintains coherent-streaming of gas after it exits from a nozzle, we have discovered the fact that to consider gas flow patterns as either laminar or turbulent is incorrect. In practical systems, various combinations of both modes of flow exist. FIG. 1 shows flow patterns 12 and 14 of gas flowing through and out of a nozzle 10. Gas in some degree of turbulence enters the conduit provided by the nozzle and, as it passes therethrough, the combined effects of the conduit wall 16 and the viscosity of the gas create a non-turbulent boundary layer or gas lamina 18 next to the wall. The thickness of the lamina builds up at a rate and to an equilibrium thickness determined by the Reynolds number ($Re$), the length of smooth passage (L), and the initial turbulence of the entering gas. However, even for conditions of generally turbulent flow there is a gas lamina of reduced thickness surrounding the remaining turbulent core 20 of the gas stream.

Upon exit from the conduit, the gas lamina, no longer supported by its parent walls, begins to break up as indicated at 19. Shear stresses are set up between the effluent stream and the ambient atmosphere and the lamina is gradually eroded away. When the lamina is finally dissipated, the ambient atmosphere is then in intimate contact with the remaining turbulent core of the gas stream. At this point 21 gross and rapid mixing of the entire gas stream with the ambient atmosphere begins. If the ambient atmosphere is air, then it can be said that air for all practical purposes is completely excluded from the tubulent core gas 20 as long as the lamina 18 is maintained. When the lamina 18 is destroyed, air quickly penetrates into the gas stream and the remaining cross-sectional area of the core of pure gas 22 rapidly goes to zero.

It is thus apparent that the gas lamina 18 acts as a sheath around the exiting gas stream and provides a basic defense for maintaining separation between the turbulent gas core and the ambient atmosphere of air. In prior standard torches, the lamina developed in the nozzle was often so thin that it barely got outside the nozzle before it was destroyed. Thus, the area of complete air exclusion is highly dependent on the nozzle elevation (with respect to the work) and nozzle diameter (internal) because of the sharp convergence of the pure but turbulent gas core once it was no longer protected by the gas lamina.

This novel concept of a protective gas lamina or sheath which promotes coherent-streaming in the exiting gas stream is in sharp contrast to that previously held. It was previously thought (see Mikhalapov Patent No. 2,-544,711) that unless laminar flow was fully developed while the gas was in the nozzle, the deterioration of the exiting gas stream was rapid and started almost immediately upon exit from the nozzle. Our discovery provides a most valuable advance in the art, because relatively short, rather than long nozzles or gas conduits can be used to produce substantial increases in the length of coherent-streaming of the gas in space after exit from the nozzle.

While the thickness of the lamina or sheath and, hence, the length of coherent-streaming can be increased by standard prior methods, such as the use of very long nozzles or low gas velocities, such methods are not generally suitable from the viewpoint of equipment design and/or process operation. As a practical alternative, our idea was conceived that extended coherent-streaming could be obtained by inserting multiple walls (surfaces) inside the nozzle upon which additional protective laminae or gas sheaths are generated. Instead of relying on just one protective sheath, the addition of a plurality of gas sheaths to surround and enclose the gas core greatly promotes coherent-streaming. FIG. 2 shows this effect when a nozzle 23 is modified to include therein a second concentric inner nozzle 24. Note that the addition of the single internal nozzle leads (due to its inner and outer wall surfaces) to the formation of two additional gas sheaths, one on each side of such inner nozzle. In combination, these laminae form a laminated protective sheath having in effect a greatly increased thickness.

Laboratory tests were made by us with torch nozzles and an auxiliary shielding device to test the validity of our novel laminated gas-sheath concept. Two different approaches were made in our investigation. In the first trial a standard nozzle 26 FIG. 3 was modified by inserting an insert 28 consisting of a grid comprising three spaced concentric walls. A comparison was made of welds obtained before and after such modification, but with constant welding conditions and flow of gas. The same gas supply system was used in each case. This is identified as System "A." In the second trial a single nozzle 30 FIG. 5 was modified by inserting a grid comprising two smaller concentric nozzles 30A and 32. Two separate gas supply systems were used to feed gas to the nozzle; one system for the center nozzle 32 and the other system for feeding both nozzles 30 and 30A. Welds were compared before and after the modification for the same total flow of gas. This is identified as System "B." The following is a description of the results obtained when investigating each of these individual systems.

System "A"

An HW-16 (Linde) torch 38 was adapted to contain a 3/32 inch diameter tungsten electrode 40 for mechanized refractory electrode-inert gas shielded arc welding. A standard (Linde) No. 14 nozzle (7/8 inch I.D.) was used at an elevation of 1/2 inch above the work and with 15 c.f.h. of argon shielding gas. The multiple-barrel insert 28 was placed in the torch nozzle as shown.

Welds were made on 1/16 inch thick stainless steel with and without the insert 28. These welds were made at 25 i.p.m., 150 amperes DCSP and 10 volts (arc voltage). At the end of the welds, as well as on all succeeding welds made during the investigation, argon post-flow was continued after the torch motion was halted and welding current shut off. It was noted that the weld made without the insert had a rough, highly oxidized surface. Even the weld end which was allowed to cool under maximum available gas protection showed a high degree of oxidation. In contrast, with the multiple barrel insert 28, the weld end showed a bright unoxidized metal surface thus indicating that when the torch was in motion, a high degree of shielding was obtained over the broad critical area which included the arc, weld puddle and the hottest parts of the heat affected zones near the puddle. Also, the entire length of such weld reflected a much higher degree of protection in terms of a smooth, less oxidized surface than was obtained without the insert, since the oxidation was limited to the colder portions of the heat affected zone. Without the insert a flow of about 30 c.f.h. would be required, other conditions being equal, to obtain gas shielding equivalent to that produced with the insert at 15 c.f.h. argon.

Having demonstrated the value of multiple barrel insert for use in refractory electrode-inert gas shielded arc welding, a second trial was made with the insert for use with consumable electrode welding. In this case, the center tube was removed from the insert 28 to allow greater clearance for the wire guide tip. Tests were made with the remaining two concentric tubes to weld 4340 steel of 0.105 inch thickness. Surface weld beads were made with 0.030 inch diameter Oxweld 71 (Linde) wire at 275 amperes DCRP with an arc voltage of 28 volts and a welding speed of 15 i.p.m. with the No. 14 (Linde) nozzle at 1/2 inch above the work. An argon-5% oxygen gas mixture was used for weld shielding at a flow rate of 40 c.f.h. In all tests, greatly improved weld shielding and arc stability were observed as compared to results obtained when the torch was used without the insert.

System "B"

In these trials an HW-13 (Linde) mechanized torch 42 was used. Welds were made on 1/16 inch thick stainless steel using a 1/8 inch diameter tungsten electrode 44. An 0.250 inch I.D. x 1/16 inch wall center nozzle 32 was used in conjunction with a complex grid consisting of a (Linde) No. 12 nozzle (3/4 inch I.D.) in which a 9/16 inch O.D. x 0.035 inch wall tube 30a was inserted. The tube was held in place by means of three wires 30b of 3/32 inch O.D. which were silver brazed to the tube prior to forcing into the No. 12 nozzle. Separate gas supply systems were provided for the center nozzle 32 and for the outer nozzle complex.

It will be noted that to adapt the standard torch for use with the center nozzle 32, which was unusually small for the given size electrode 44, a series of special modifications were necessary. The end of the collet body 45 was threaded to fit the center nozzle 32. The bore in the collet body was enlarged to 0.250 inch diameter to permit the gas to flow in an annular stream around the electrode. The four original gas ports in the collet body were plugged and the original water jacket 47 was modified to provide a separate flow of gas to the outer nozzle complex. One additional feature of considerable importance in the successful operation of this torch was the use of an electrode-centering device. Such centering was accomplished by tilting the electrode collet 46 by means of the eccentric 48 shown in contact with the top of the collet. With the aid of this centering system it was possible to employ unusually small center nozzles of the order of 0.150 to 0.300 inch I.D. with the 1/8 inch diameter electrodes. Proportionately smaller nozzles could be used with smaller diameter electrodes without encountering the interference due to electrode-nozzle misalignment.

In addition to the multiple wall configuration shown in FIGS. 4 and 6 where a series of concentric tubes were employed, other configurations may also be used to accomplish similar benefits. For example, bundles of tubes, FIG. 7, may be used, preferably with gas flowing inside as well as outside of the walls of the tube bundles. Honeycomb grids with lattices that are triangular, square, hexagonal, etc., FIGS. 8 and 9, may also be used. Such configurations all have in common the effect of producing wall surfaces which completely surround the electrode, thereby producing a series of protective gas sheaths to enclose the core gas containing the arc.

The improvements in coherent-streaming obtained with the invention are greater than that which can be explained just in terms of the added protective gas-sheaths. An examination of the standard gas flow parameters (Heat Transmission, W. H. McAdams, McGraw Hill, New York, 1942, and Mikhalapov, Patent No. 2,544,711), such as Reynolds numbers and $L/D_e$ ratios reveals that even these values are favorably changed to promote coherent-streaming. When the geometry of a conduit is modified to obtain an increase of its cross-section perimeter, the Reynolds number for the modified conduit will be less than that of the original conduit, assuming a constant flow rate of gas. Conversely, the $L/De$ ratio for the modified conduit will be greater than the original.

The mere fact that favorable Reynolds numbers and $L/De$ ratios are obtained in the modified conduit, however, does not insure that coherent-streaming and good weld shielding will also be obtained. It is also necessary to insure that the gas, upon exiting from the multiple paths, will merge to form a gas column without mixing with air or allowing pockets of air to penetrate into the core of the gas stream. In other treatments of the subject, allowance is made for the gas column formation within the main conduit by terminating the multiple paths a considerable distance upstream from the point at which gas exits into space. This procedure imposes a penalty on the torch and/or nozzle design by requiring an objectionable increase in conduit length. The need for such increases in conduit length is eliminated when made according to the invention which permits the shortening of the main conduit such that the multiple internal walls may even project outside of the main conduit.

The use of fins extending radially from a conduit wall has sometimes been recommended for obtaining reduced $Re$ and increased $L/De$ values. Such fins, however, do not have the special advantage of generating multiple gas-laminae which form a series of continuous protective gas sheaths around the gas core. Furthermore, we have found that the use of radial fins can actually promote air infiltration into the gas stream when such fins terminate near the end of the conduit. This occurs because of the split or separation formed in the gas stream as it passes on both sides of the fin wall. The separation in the gas stream will heal at the end of the wall only if it is not exposed to the atmosphere or if it is of a thickness not exceeding about 0.020 inch. If air can come into contact with the separation then it will be aspirated into it, thus forming an air pocket penetrating deep into the gas stream with the result that welds become contaminated regardless of the purity of the balance of the gas stream. For example, a 1/16 inch thick radial fin on a nozzle will cause air infiltration into the gas stream and weld contamination if the bottom edge of the fin approaches within about ½ inch of the end of the nozzle. On the other hand, walls entirely within the gas stream, as with internal concentric tubes, can be quite thick, say 1/8 inch, without danger of air infiltration even when the internal walls extend below the outer nozzle. Radial fin wall thickness must be reduced to the order of 0.020 inch or less if they terminate near the end or outside of a nozzle.

In summary, the subdivision of a conduit into a multiplicity of conduits or paths designed according to the invention promotes coherent-streaming and optimum weld shielding not only because of the additional gas sheaths, but also because the Reynolds numbers are decreased and $L/De$ ratios are increased. Furthermore, all gas sheaths, including the original will be thicker than before the subdivision. The overall improvement in welding performance obtained, however, far exceeds the aggregate of these effects. Each of the elements interacts to improve the other and to provide a combination which is particularly suited to the special requirements of the welding process. For example, the nozzle-to-work distance usable with the multiple wall nozzle, FIG. 5, at a total argon flow of 15 c.f.h. is greater than the sum of such distances obtained when the nozzle elements are used individually with their respective proportions of argon flow.

The invention includes the following new and unexpected results and advantages over the prior art:

(1) Instead of increasing the thickness of the protective gas lamina by the use of long conduits, additional laminae which surround the electrode are generated within the gas stream by the use of a multiplicity of gas paths or passages within the original conduit.

(2) Excellent weld shielding over a broad area which included the arc, weld puddle and the hotter portions of the heat affected zone is obtained at a nozzle-to-work distance of ½ inch with an HW-16 (Linde) torch equipped with a non-consumable electrode at an argon flow of 15 c.f.h. when three concentric cylinders are inserted in a standard No. 14 (Linde) nozzle. Without the insert, but at otherwise the same conditions, arc instability and gross weld contamination are encountered. An argon flow of 30 c.f.h. is required when the insert is not used to obtain shielding equivalent to that obtained at 15 c.f.h. with the insert at otherwise the same conditions.

(3) Improved arc stability and weld shielding are obtained at a nozzle-to-work distance of ½ inch with an HW-16 (Linde) torch and a consumable electrode at an argon-5% oxygen gas mixture flow of 40 c.f.h. when two concentric cylinders are inserted in a standard No. 14 (Linde) nozzle as compared to welding without the insert at otherwise the same conditions.

(4) Excellent welds at a nozzle-to-work distance of 1 inch are obtained with an HW-13 (Linde) torch modified to supply argon to a grid comprising three concentric nozzles. Argon flows totaling 15 c.f.h. were employed; 3.5 c.f.h. in the ¼ inch I.D. center nozzle and 11.5 c.f.h. through the outer nozzle complex. With the standard HW-13 torch and No. 12 nozzle alone, good weld shielding at 15 c.f.h. argon flow could be obtained only at a nozzle-to-work distance of about ½ inch or less.

Furthermore, the invention provides for maintaining an arc inert and protected from the air atmosphere to a degree far superior to any previously known method for a given flow of shielding gas through a short conduit or nozzle.

Still another important novel feature is that the coherent-streaming of the gases exiting from the nozzle provide for a nozzle-to-work distance of the order of 1 inch, as compared to the standard prior nozzle distance of ½ inch or less—the advantage derived being that the criticality of the nozzle-to-work distance is greatly reduced.

While multiple-walled nozzle grids are suitable for our purpose, other inserts that may be used include a bundle of tubes, honeycomb grids (square, hexagonal, triangular, etc.). The invention also makes possible a substantial saving in shielding gas in cases where nozzle-to-work distances can be minimized—resulting in better shielding even with much less gas.

Thus the invention makes it possible to obtain optimum weld shielding with short nozzles in that one or a combination of the following benefits are obtained.

(a) Broader area coverage can be obtained with a given nozzle width and flow rate of gas.

(b) Equal area coverage can be obtained with a given nozzle width but at considerably reduced gas flow rate.

(c) Longer nozzle-to-work distance can be employed and still obtain good weld shielding.

What is claimed is:

1. Gas stream-shielded arc working which comprises protecting an arc drawn between an elongated electrode and a workpiece by generating a multiplicity of separate gas-sheaths within a gas stream surrounding the end portion of such electrode and flowing toward such workpiece so as to envelop such arc in a coherent stream of shielding gas containing such gas-sheaths which act to exclude the ambient atmosphere from the interior of the stream even in case turbulence is present in the stream between such gas-sheaths and in the core of the gas stream immediately adjacent to and surrounding such arc, such gas-sheaths being generated by flow of the gas adjacent to a multiplicity of wall-surfaces located directly upstream with respect to the gas-sheaths generated thereby said gas-sheaths being generated a distance of less than 3 inches from the exit of said gas stream into free space.

2. Process of protecting an arc from ambient atmosphere which comprises discharging the arc-shielding gas through a grid of partitions, the major wall surfaces of which are parallel to the direction of flow of such gas and act to generate gas laminae adjacent such wall surfaces that create extended gas-sheaths after leaving the latter, which gas-sheaths surround such arc, protecting the latter from such ambient atmosphere regardless of the degree of turbulence between such gas-sheaths within the composite gas stream flowing around such arc said gas-sheaths being generated a distance of less than 3 inches from the exit of said gas stream into free space.

3. In an arc torch the combination with an elongated electrode, a nozzle surrounding the end portion of such electrode in spaced concentric relation, and means for supplying arc shielding gas to the space between such electrode and the inside of said nozzle for discharge therefrom to shield an arc energized between the end of said electrode and a workpiece, of means for generating a multiplicity of gas-sheaths in the gas stream that is discharged from said nozzle, comprising a grid of partitions mounted in the outlet of said nozzle, the major wall surfaces of which are parallel to the direction of flow of such gas stream.

4. An insert for an arc torch provided with a nozzle surrounding an elongated electrode to provide a gas shielding discharge space, said insert consisting of a grid of partitions the major wall surfaces of which are parallel to the direction of flow of such gas, and means for securing said insert in such space, the effect of said insert being to allow the use of a relatively short (less than three inches) nozzle with optimum gas shielding of an arc energized at the end of such electrode, regardless of the degree of turbulence in the core of the gas stream discharged thereby.

5. An insert as defined by claim 4, in which the grid is in the form of concentric cylinders.

6. An insert as defined by claim 4, in which the grid is in the form of a honeycomb.

7. An insert as defined by claim 4, in which the grid is in the form of a rectangular lattice.

8. A gas cup for an arc torch including an elongated electrode, said cup comprising a grid of partitions the major wall surfaces of which are parallel to the direction of flow of such gas for optimum gas shielding of an arc energized at the end of such electrode, regardless of the degree of turbulence in the core of the gas stream discharged thereby.

9. A non-consumable gas-shielded arc torch comprising the combination with a gas cup comprising a grid having a central passage, of an electrode centering device associated with the torch for positioning a non-consumable electrode in the center of such passage in said grid.

References Cited in the file of this patent

UNITED STATES PATENTS

| | | |
|---|---|---|
| 1,746,196 | Langmuir et al. | Feb. 4, 1930 |
| 2,544,711 | Mikhalapov | Mar. 13, 1951 |